United States Patent
Housel

(10) Patent No.: US 6,888,647 B2
(45) Date of Patent: May 3, 2005

(54) PROOFING WITH WATERMARK INFORMATION CREATED BY A RASTER IMAGING PROCESSOR

(75) Inventor: Edward M. Housel, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 957 days.

(21) Appl. No.: 09/777,475

(22) Filed: Feb. 6, 2001

(65) Prior Publication Data

US 2002/0105667 A1 Aug. 8, 2002

(51) Int. Cl.⁷ .............................. G06K 1/00; G06F 15/00
(52) U.S. Cl. ...................... 358/1.9; 358/3.28; 358/1.11; 358/1.16; 358/1.18; 358/504; 358/406
(58) Field of Search ................................. 358/1.9, 3.28, 358/1.11, 1.14–1.18, 501, 504, 401, 406, 527

(56) References Cited

U.S. PATENT DOCUMENTS

| | | | |
|---|---|---|---|
| 5,299,021 A | * | 3/1994 | Gartner ...................... 358/401 |
| 5,436,730 A | * | 7/1995 | Hube .......................... 358/401 |
| 5,555,099 A | * | 9/1996 | Telle .......................... 358/401 |
| 6,075,614 A | | 6/2000 | Ohtsuka et al. .............. 358/1.1 |
| 6,724,492 B1 | * | 4/2004 | Iwase et al. ................ 358/1.13 |
| 2002/0060806 A1 | * | 5/2002 | Gassho et al. ............. 358/1.15 |
| 2002/0131070 A1 | * | 9/2002 | Housel et al. ............. 358/1.15 |

FOREIGN PATENT DOCUMENTS

| | | |
|---|---|---|
| EP | 0 703 524 A1 | 3/1996 |
| EP | 0 963 104 A1 | 12/1999 |
| WO | WO 9832096 | 7/1998 |

OTHER PUBLICATIONS

Gettys, et al., (1985) "C Language X Interface", Massachusetts Institute of Technology, Cambridge, Massachusetts and Digital Equipment Corporation, Maynard, Massachusetts.
European Search Report EP 02 00 1101.

* cited by examiner

Primary Examiner—Scott A. Rogers
(74) Attorney, Agent, or Firm—Richard A. Romanchik

(57) ABSTRACT

Methods and systems for generating a proof set of a digital print job and delaying the completion of the print job until the proof set is approved are presented. The invention further includes generation of a proof set that includes print feature information on a page basis printed on the proof set in a watermark font.

16 Claims, 2 Drawing Sheets

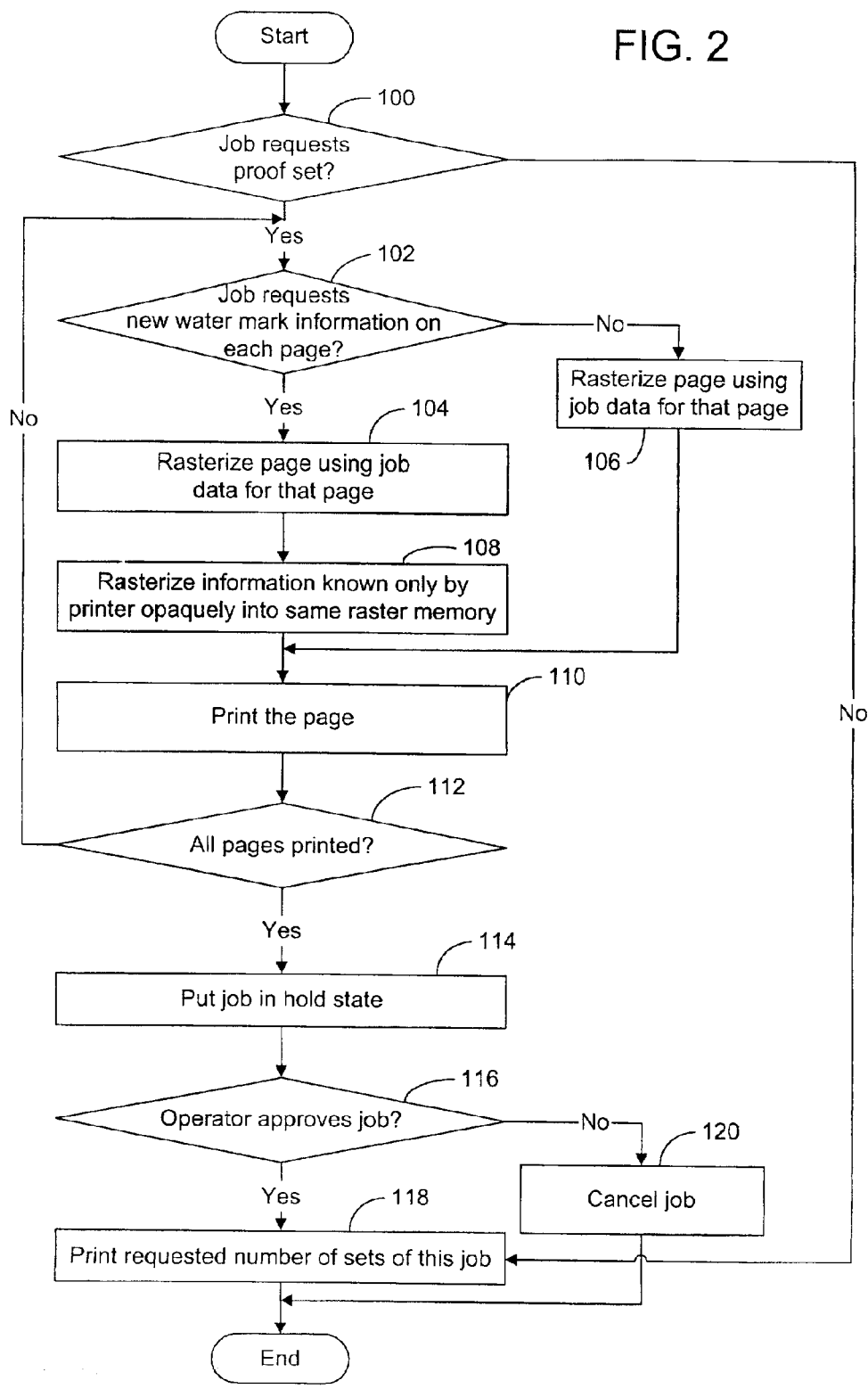

PROOFING WITH WATERMARK INFORMATION CREATED BY A RASTER IMAGING PROCESSOR

FIELD OF INVENTION

The present invention relates generally to the field of digital imaging. More particularly, it relates digital imaging for the purpose of printing documents and images and apparatus and methods for improving the efficiency of such printing.

BACKGROUND OF THE INVENTION

High speed digital printers are in common use today for many production processes ranging from printing of a single document to large scale production of multiple copies of documents. In a typical system, the document or image to be printed is represented by digital data. This data can be created either through scanning or digital generation of the document or the image via a computer. This data is typically supplied to a printer over a network connection. The data is then processed by a raster imaging processor (RIP) associated with the printer and converted to a format usable by the printer to recreate the image.

Historically, once a print job was sent to a printer, it had to run its course, resulting in the job going to completion even if errors were detected before the print was complete. Prior art printers included mechanisms by which an operator could cancel a print job, but typically these mechanisms require an unusually high degree of operator involvement in the print job. Thus, often print jobs had to be printed multiple times because of problems later found in the print job. This is especially troublesome in large print jobs with multiple copies of a document being printed, as the need to rerun the print job was expensive and wasteful.

Some of the newer printers allow for the generation of a proof set to allow the operator to check the print job before multiple copies are run. The printer receives a print job from the RIP and prints a proof set. The print job is then put into a hold queue while an operator reviews the proof set for accuracy before running the entire production run. Such proofing is an effective method for conserving resources and decreasing costs by avoiding the generation of multiple copies of a job with errors. If the operator uncovers errors in the proof set, then steps are taken to correct the errors before further expense or waste is incurred. At times, however, the correction of the errors is a very arduous and time consuming task. This is in large part due to a lack of information on the part of the operator. He often lacks sufficient information about the job to key back into the job and make appropriate corrections. As an example, if a page in the proof is not printing as expected or desired, it becomes necessary to ascertain what the features are that are associated with that page to determine why it printed the way it did. The features while known by the printer are not readily available to the printer operator. Historically, it requires the operator or the job requester to revisit the original generation of the job to determine the features. The effort to identify and correct problem can thus become a large task.

Thus, there remains a need for a system and method that eases the review of proof sets of print jobs and provides a basis for making any necessary adjustments.

SUMMARY OF THE INVENTION

In the present invention methods and apparatus are provided to enhance the ability and the efficiency of making corrections to a proof set. At the time a digital representation of a document or image is processed by the RIP, information that can assist in the processing of proof sets can be or is available. Such information includes input page number, output page number, special commands and the like. The present invention makes that information available to the operator on a page by page basis. Specifically, the present invention puts information available from the RIP on the actual printed pages of the proof set. The information could then be used to help in the proofing process. Once the job has cleared the proofing process, the information would be suppressed from printing on any final run.

One aspect of the present invention relates to a system for digital printing that comprises a digital printer and a data processor associated with said digital printer. The data processor process information for the printer to print. In most cases the data processor may be part of the printer, but it could be separate and connected to the printer to allow the flow of information. The data processor is capable of receiving a print job in digital form, and determining whether the print job requests the printing of a proof set of the print job. If there is such a request, the data processor further determines whether the print job requests that certain feature information should be printed on the pages of the proof set. If the data processor determines that certain feature information should be printed on the pages of the proof set, then the pages are printed by the digital printer with the feature information on the appropriate pages of the proof set.

Another aspect of the invention is directed to a method of printing a proof set of a document. In the method a print job is analyzed to determine whether a proof set should be printed and to determine whether any feature information from the print job should be printed on the pages of the proof set. After making that determination the pages of the print job are rasterized and stored in a raster memory file. This raster memory file includes not only the rasterized page but also rasterized information relating to the features. The pages of the proof set with the feature information are then printed as the proof set. The print job is placed in a hold queue while the proof set can be reviewed. The print job is released from the hold queue upon receipt of operator instructions indicating approval of the proof set. The print job is then printed in final form, suppressing the feature information that was printed on the pages of the proof set.

BRIEF DESCRIPTION OF THE DRAWINGS

FIG. 2 is a flow chart illustrating aspects of the process of the present invention.

DETAILED DESCRIPTION OF PREFERRED EMBODIMENTS

Figure 1:
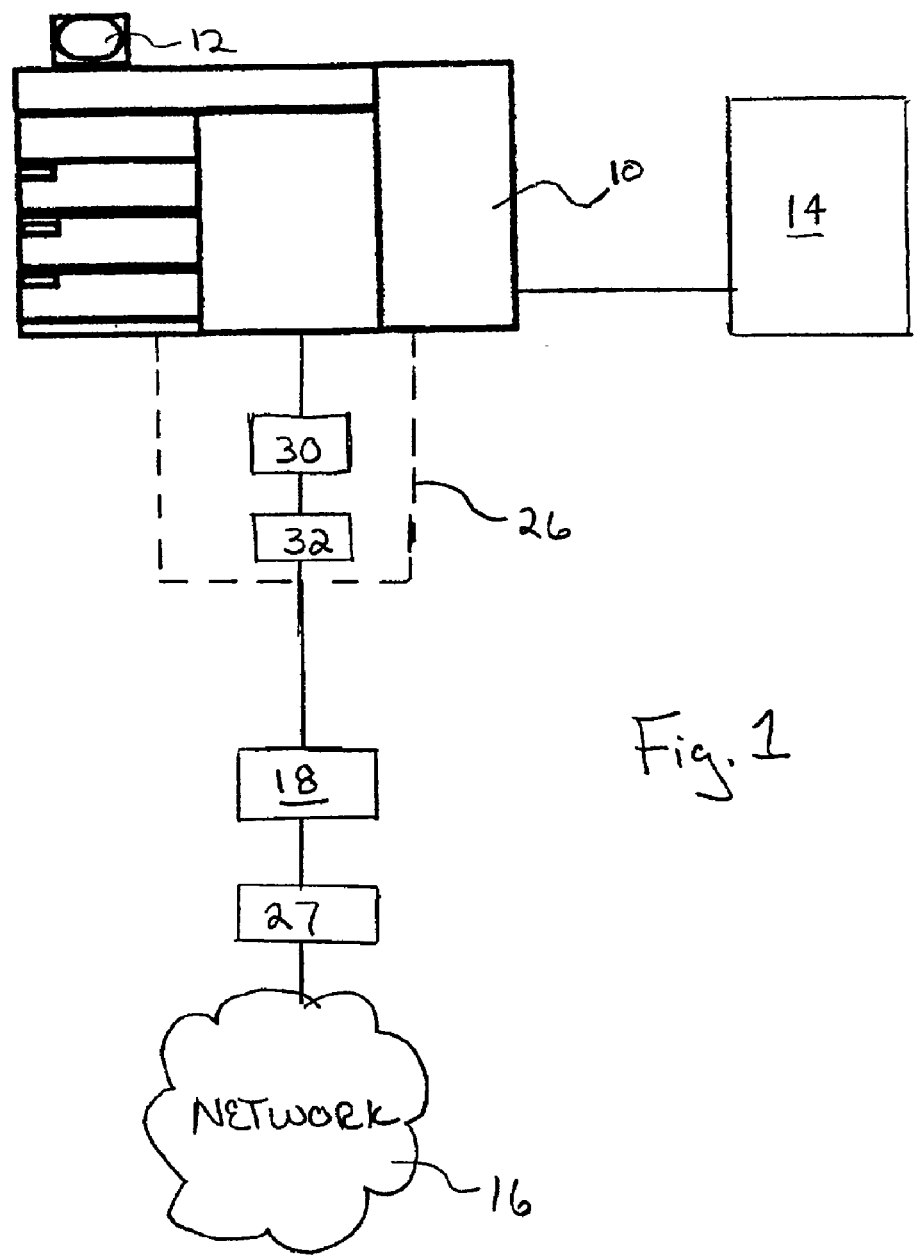
FIG. 1 depicts typical layout of a digital printing system.

The present invention relates to methods to improve the proofing system in a printing system. FIG. 1 illustrates a typical printer system. The system will include a printer 10, a user interface 12, and potentially finishing equipment 14. The printer 10 is set up to receive a print job. Generally, the print job will be transmitted from a network 16 via a network interface 18. In the case of a stand alone printer the print job may be loaded locally or input through an associated scanner. In either case, the print job will have features associated with it that define how the print job is to be processed. The features could be part of the print job as it is received by the printer or they can be added to the job locally by the printer operator using the interface 12.

The printer 10 includes a raster image processor (RIP) 26 that receives incoming data from a network 16 to which the printer 10 is connected. Prior to being transferred to the raster image processor 26, the print job may be held in a print server queue 27 on the network 16. The raster image processor 26 includes processing unit 30, which receives control commands and data from the network 28. Control commands are translated into machine control language by the processing unit 30, while incoming print jobs and program codes are stored in a print job buffer 32.

At the highest level, the print job must come to the RIP 26 with some important job request information. This information is generally referred to as features of the print job. One such feature is a request for a proof set. The present invention relates to print jobs including such a feature.

FIG. 2 is a flow chart illustrating the operation of the present invention. In the method of the present invention, the printer 10 through its associated RIP 26 analyzes the print job to determine the proper handling of the job. As shown in FIG. 2 when the print job is submitted to the RIP 26, the first step 100 is to determine whether the print job requests a proof set. If there is no request for a proof set, the print job is sent for printing as normal. If there is a request for a proof set, then the second step 102 is to review the print job to determine whether there is a request to print the feature information on the proof pages. If there is no request to print the feature information on the pages of the proof set, then the proof page is rasterized in step 106 and routed for printing in step 110.

If there is a request to print the feature information on the page of the proof step, then in step 104, the RIP 26 creates a raster memory file for the proof page using the features in the print job. In step 108 the RIP 26 further rasterizes page information and stores the page information in the same raster memory file, thus printing job data along with feature information. In step 110, the proof page is printed including printing the feature information on the page.

After the printing in step 110, in step 112, the RIP 26 determines whether all the pages of the print job have been printed. If it determines that additional pages remain to be printed then the RIP 26 returns to step 102 and determines whether the next page requests that feature information be printed on the page. The next page then proceeds through step 102 through 110. This process is repeated until all the proof pages are printed.

Once all the pages in the proof set are printed, step 114 puts the print job in a hold queue. The job remains in the hold queue until the operator approves the job. In Step 116 it is determine whether the operator approves the job. If the job is approved, in step 118 the print job is released from the hold queue and the final job is printed. If the operator does not approve the job in step 116 then in step 120 the job is canceled and erased from the hold queue without being printed.

Typically, when the feature information is printed on the proof page, it is printed in a different font than the principal text, for example, at 50% gray, to differentiate the feature information from the principal text. While virtually any different font can be used, an example of such a font is a watermark font. Indeed, with a watermark font the feature information can be printed on top of the principal text.

It will be appreciated that scope and nature of the feature information printed on the pages of the proof set can be varied. It can include, job level and/or page level features. It is also not necessary the feature information be printed on every page of the proof set. For example, job level feature may only be printed on the first page of the job and not page level features be printed at all. As another example, it may be desired that only selected features be printed and that feature may only apply to certain pages. For example on common feature of print jobs is plex. Plex refers to whether the printing is to single sided (simplex) or two sided (duplex). It may be desirable to have the information as to the plex feature printed on the proof pages to confirm where within the document the feature is changed. Thus through the present invention the information is printed on the pages of the proof set and the operator can confirm the feature with the print results. Moreover, if necessary the operator can determine where the feature changes in order to make appropriate changes to the feature settings.

Thus, with the present invention the operator, or any person who views the page of the proof set, can see the feature information associated with the page that resulted in the proof page being printed in the manner in which it was printed. Having this information makes it easier to adjust the features should the proof page not be printed in the manner desired.

It should be understood that the illustrated embodiments are exemplary only and should not be taken as limiting the scope of the present invention. For example, the invention can be used with various protocols and is not limited to the protocols detailed herein. The claims should not be read as limited to the order or elements unless stated to that effect. Therefore, all embodiments that come within the scope and spirit of the following claims and equivalents thereto are claimed as the invention.

I claim:

1. A system for digital printing comprising:
    a digital printer; and
    a data processor associated with said digital printer, the data processor capable of receiving a print job in digital form, wherein the data processor determines whether the print job includes a feature requiring the printing of a proof set of the print job and if so it further determines whether the print job requests that certain features should be printed on the proof page.

2. The system of claim 1 wherein the data processor is a raster imaging processor.

3. The system of claim 1 wherein after the data processor determines whether certain information and features should be printed on the proof page the proof set is printed by the digital printer with the feature information on each of the pages of the proof set.

4. The system of claim 3 wherein the feature information is printed in a font different than the font of the principal text of the print job.

5. The system of claim 3 wherein the feature information is printed in a font that is larger than that of the principal text.

6. The system of claim 4 wherein the font is a watermark font in a shade of gray.

7. The system of claim 6 wherein the feature information is rasterized before the principal text, such that the principal text is printed over the feature information.

8. A method of printing a proof set of a document comprising the steps of:
    analyzing a print job to determine whether a proof set should be printed;
    further analyzing the print job to determine whether any feature information from the print job should be printed on the pages of the proof set; and
    rasterizing the pages of the print job and storing the rasterized pages in a raster memory file said file including rasterized information relating to the features;
    printing the pages of the proof set with the feature information being printed on the pages of the proof set.

9. The method of claim 8 wherein the feature information is printed in a different font than the text of the print job.

10. The method of claim 9 wherein the feature information is printed in a larger font than that used to print the text of the print job.

11. The method of claim 9 wherein the feature information is rasterized before the text of the print job, such that the print job text is printed over the feature information.

12. The method of claim 9 wherein the font is a watermark font in a shade of gray.

13. The method of claim 8 wherein the feature information comprises both job level and page level features.

14. The method of claim 8 wherein every page of the proof set has feature information printed thereon.

15. The method of claim 8 further comprising the steps of:

storing the print job in a hold queue;

releasing the print job from the hold queue upon receipt of operator instructions; and printing the print job in final form, suppressing the feature information that was printed on the pages of the proof set.

16. The method of claim 15 wherein the print job is stored in the hold queue after the proof set is printed.

* * * * *